US008233166B2

(12) United States Patent
Ogasawara

(10) Patent No.: US 8,233,166 B2
(45) Date of Patent: Jul. 31, 2012

(54) IMAGE FORMING APPARATUS, METHOD FOR FORMING IMAGE, AND PROGRAM

(75) Inventor: Kenji Ogasawara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 701 days.

(21) Appl. No.: 12/401,819

(22) Filed: Mar. 11, 2009

(65) Prior Publication Data

US 2009/0244583 A1 Oct. 1, 2009

(30) Foreign Application Priority Data

Mar. 27, 2008 (JP) ................................ 2008-082602

(51) Int. Cl.

| | |
|---|---|
| ***G06F 3/12*** | (2006.01) |
| ***G06F 17/00*** | (2006.01) |
| ***G06F 3/048*** | (2006.01) |
| ***G06K 15/00*** | (2006.01) |
| ***H04N 1/00*** | (2006.01) |

(52) U.S. Cl. ..................... 358/1.13; 358/1.14; 358/1.15; 358/1.6; 715/209; 715/764; 715/838

(58) Field of Classification Search ................. 358/1.13, 358/1.15, 1.6, 2.1, 1.14, 448, 462, 403, 1.12; 345/98; 715/764, 209, 222, 838, 275
See application file for complete search history.

(56) References Cited

U.S. PATENT DOCUMENTS 5,940,583 A 8/1999 Taira et al.

FOREIGN PATENT DOCUMENTS

| | | |
|---|---|---|
| JP | 07-134449 | 5/1995 |
| JP | 08-125838 | 5/1996 |
| JP | 08-137909 | 5/1996 |
| JP | 2000-147943 | 5/2000 |
| JP | 2002-326762 | 11/2002 |
| JP | 2003-016056 | 1/2003 |
| JP | 2003-091528 | 3/2003 |
| JP | 2003-132042 | 5/2003 |
| JP | 2005-153326 | 6/2005 |
| JP | 2007-123990 | 5/2007 |

OTHER PUBLICATIONS

Hiroshi Yokota, Image Forming Device, Jun. 16, 2005, machine translation of Japanese Patent Application Publication, JP2005153326, all pages.*

Hiroshi Ogura, Facsimile Equipment, May 17, 1996, machine translation Japanese Patent Application Publication, JP08125838, all pases.*

* cited by examiner

*Primary Examiner* — Benny Q Tieu
*Assistant Examiner* — Ngon Nguyen
(74) *Attorney, Agent, or Firm* — Edwards Wildman Palmer LLP; David G. Conlin; Stephen D. LeBarron

(57) ABSTRACT

An image forming apparatus that picks only necessary pages up from a plurality of originals and copies after aligning in an order of pages so as to reduce a work burden on a user is provided. The image forming apparatus having a copy function includes an identification information extracting portion for extracting identification information (page number and heading information) which identifies originals from image data of read originals, a selecting portion for displaying the extracted identification information and accepting the identification information selected by the user as a target for image formation, and an output portion for printing image data excluding the identification information from the image data of the target for image formation accepted by the selecting portion. Here, the identification information is preferably formed with code information.

8 Claims, 18 Drawing Sheets

FIG.5

| IMAGE DATA No. | CHAPTER NUMBER | PAGE NUMBER | HEADING | FILE NAME OF IMAGE DATA | SELECTION FLAG |
|---|---|---|---|---|---|
| 1 | — | 1 | COVER | FILE 1 | 0 |
| 2 | — | 2 | CONTENT | FILE 2 | 0 |
| 3 | — | 3 | CONTENT | FILE 3 | 0 |
| 4 | 1 | 4 | HEADING 1 | FILE 4 | 0 |
| 5 | 1 | 5 | — | FILE 5 | 0 |
| 6 | 1 | 6 | — | FILE 6 | 0 |
| 7 | 1 | 7 | — | FILE 7 | 0 |
| 8 | 1 | 8 | — | FILE 8 | 0 |
| 9 | 1 | 9 | — | FILE 9 | 0 |
| 10 | 2-1 | 10 | HEADING 2 | FILE 10 | 0 |
| 11 | 2-2 | 11 | — | FILE 11 | 0 |
| 12 | 2-2 | 12 | — | FILE 12 | 0 |
| 13 | 2-2 | 13 | — | FILE 13 | 0 |
| 14 | 2-3 | 14 | — | FILE 14 | 0 |
| 15 | 3 | 15 | HEADING 3 | FILE 15 | 0 |
| 16 | 3 | 16 | — | FILE 16 | 0 |
| 17 | 3 | 17 | — | FILE 17 | 0 |
| 18 | 3 | 18 | — | FILE 18 | 0 |
| 19 | 3 | 19 | — | FILE 19 | 0 |
| 20 | 3 | 20 | — | FILE 20 | 0 |
| 21 | 3 | 21 | — | FILE 21 | 0 |
| 22 | — | 22 | SUMMARY | FILE 22 | 0 |
| 23 | END | END | END | — | — |

FIG.12

| IMAGE DATA No. | CHAPTER NUMBER | PAGE NUMBER | HEADING | FILE NAME OF IMAGE DATA | SELECTION FLAG |
|---|---|---|---|---|---|
| 1 | — | 1 | COVER | FILE 1 | 0 |
| 2 | — | 2 | CONTENT | FILE 2 | 0 |
| 3 | — | 3 | CONTENT | FILE 3 | 0 |
| 4 | 1 | 4 | HEADING 1 | FILE 4 | 0 |
| 5 | 1 | 5 | — | FILE 5 | 0 |
| 6 | 1 | 6 | — | FILE 6 | 0 |
| 7 | 1 | 7 | — | FILE 7 | 0 |
| 8 | 1 | 8 | — | FILE 8 | 0 |
| 9 | 1 | 9 | — | FILE 9 | 0 |
| 10 | 2-1 | 10 | HEADING 2 | FILE 10 | 1 |
| 11 | 2-2 | 11 | — | FILE 11 | 1 |
| 12 | 2-2 | 12 | — | FILE 12 | 1 |
| 13 | 2-2 | 13 | — | FILE 13 | 1 |
| 14 | 2-3 | 14 | — | FILE 14 | 0 |
| 15 | 3 | 15 | HEADING 3 | FILE 15 | 1 |
| 16 | 3 | 16 | — | FILE 16 | 1 |
| 17 | 3 | 17 | — | FILE 17 | 0 |
| 18 | 3 | 18 | — | FILE 18 | 0 |
| 19 | 3 | 19 | — | FILE 19 | 0 |
| 20 | 3 | 20 | — | FILE 20 | 1 |
| 21 | 3 | 21 | — | FILE 21 | 0 |
| 22 | — | 22 | SUMMARY | FILE 22 | 0 |
| 23 | END | END | END | — | — |

FIG.14

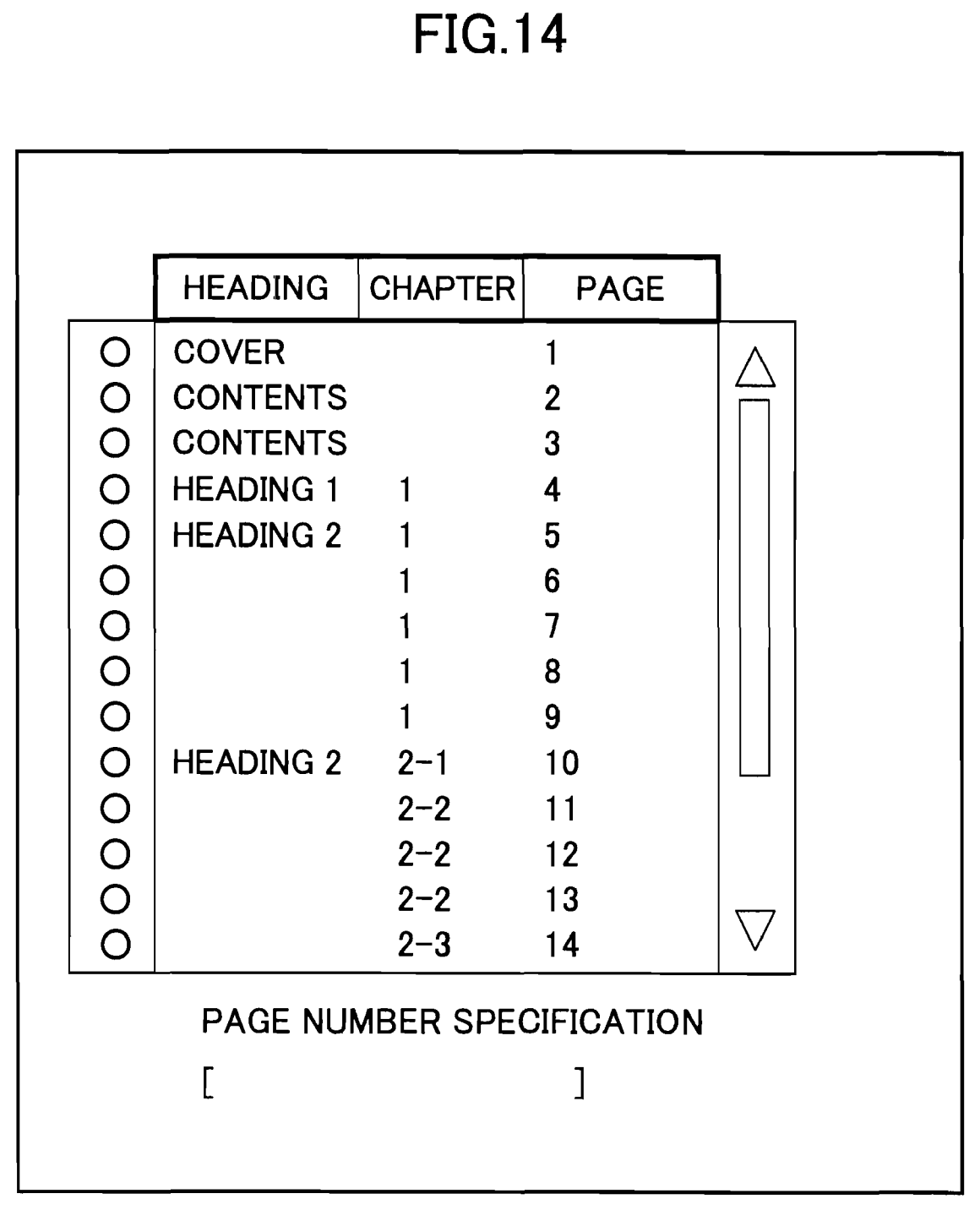

| | HEADING | CHAPTER | PAGE |
|---|---|---|---|
| ○ | COVER | | 1 |
| ○ | CONTENTS | | 2 |
| ○ | CONTENTS | | 3 |
| ○ | HEADING 1 | 1 | 4 |
| ○ | HEADING 2 | 1 | 5 |
| ○ | | 1 | 6 |
| ○ | | 1 | 7 |
| ○ | | 1 | 8 |
| ○ | | 1 | 9 |
| ○ | HEADING 2 | 2-1 | 10 |
| ○ | | 2-2 | 11 |
| ○ | | 2-2 | 12 |
| ○ | | 2-2 | 13 |
| ○ | | 2-3 | 14 |

PAGE NUMBER SPECIFICATION

[ ]

FIG.17

| IMAGE DATA No. | CHAPTER NUMBER | PAGE NUMBER | HEADING | FILE NAME OF IMAGE DATA | SELECTION FLAG |
|---|---|---|---|---|---|
| 1 | — | 1 | COVER | FILE 1 | 0 |
| 2 | — | 2 | CONTENT | FILE 2 | 0 |
| 3 | — | 3 | CONTENT | FILE 3 | 0 |
| 4 | 1 | 4 | HEADING 1 | FILE 4 | 0 |
| 5 | 1 | 5 | — | FILE 5 | 0 |
| 6 | 1 | 6 | — | FILE 6 | 0 |
| 7 | 1 | 7 | — | FILE 7 | 0 |
| 8 | 1 | 8 | — | FILE 8 | 0 |
| 9 | 1 | 9 | — | FILE 9 | 0 |
| 10 | 2-2 | 12 | HEADING 2 | FILE 10 | 0 |
| 11 | 2-1 | 10 | — | FILE 11 | 0 |
| 12 | 2-2 | 11 | — | FILE 12 | 0 |
| 13 | 2-2 | 13 | — | FILE 13 | 0 |
| 14 | 2-3 | 14 | — | FILE 14 | 0 |
| 15 | 3 | 15 | HEADING 3 | FILE 15 | 0 |
| 16 | 3 | 16 | — | FILE 16 | 0 |
| 17 | 3 | 17 | — | FILE 17 | 0 |
| 18 | 3 | 18 | — | FILE 18 | 0 |
| 19 | 3 | 19 | — | FILE 19 | 0 |
| 21 | 3 | 20 | — | FILE 20 | 0 |
| 22 | 3 | 21 | — | FILE 21 | 0 |
| 23 | — | 22 | SUMMARY | FILE 22 | 0 |
| 24 | END | END | END | — | — |

NO IDENTIFICATION INFORMATION IN 20TH SHEET OF READ ORIGINALS

ORIGINAL OF 12TH PAGE DOES NOT ACCORD WITH ORDER OF PAGES

FIG.18

| IMAGE DATA No. | CHAPTER NUMBER | PAGE NUMBER | HEADING | FILE NAME OF IMAGE DATA | SELECTION FLAG |
|---|---|---|---|---|---|
| 1 | — | 1 | COVER | FILE 1 | 0 |
| 2 | — | 2 | CONTENT | FILE 2 | 0 |
| 3 | — | 3 | CONTENT | FILE 3 | 0 |
| 4 | 1 | 4 | HEADING 1 | FILE 4 | 0 |
| 5 | 1 | 5 | — | FILE 5 | 0 |
| 6 | 1 | 6 | — | FILE 6 | 0 |
| 7 | 1 | 7 | — | FILE 7 | 0 |
| 8 | 1 | 8 | — | FILE 8 | 0 |
| 9 | 1 | 9 | — | FILE 9 | 0 |
| 10 | 2-2 | 12 | HEADING 2 | FILE 11 | 0 |
| 11 | 2-1 | 10 | — | FILE 12 | 0 |
| 12 | 2-2 | 11 | — | FILE 10 | 0 |
| 13 | 2-2 | 13 | — | FILE 13 | 0 |
| 14 | 2-3 | 14 | — | FILE 14 | 0 |
| 15 | 3 | 15 | HEADING 3 | FILE 15 | 0 |
| 16 | 3 | 16 | — | FILE 16 | 0 |
| 17 | 3 | 17 | — | FILE 17 | 0 |
| 18 | 3 | 18 | — | FILE 18 | 0 |
| 19 | 3 | 19 | — | FILE 19 | 0 |
| 21 | 3 | 20 | — | FILE 20 | 0 |
| 22 | 3 | 21 | — | FILE 21 | 0 |
| 23 | — | 22 | SUMMARY | FILE 22 | 0 |
| 24 | END | END | END | — | — |

NO IDENTIFICATION INFORMATION IN 20TH SHEET OF READ ORIGINALS

REARRANGE THE ORIGINAL OF 12TH PAGE IN THE ORDER OF PAGES NUMBERS

IMAGE FORMING APPARATUS, METHOD FOR FORMING IMAGE, AND PROGRAM

CROSS-NOTING PARAGRAPH

This non-provisional application claims priority under 35 U.S.C. §119(a) on Patent Application No. 2008-082602 filed in JAPAN on Mar. 27, 2008, the entire contents of which are hereby incorporated herein by reference.

FIELD OF THE INVENTION

The present invention relates to an image forming apparatus having a copy function, a method for forming an image, and a program.

BACKGROUND OF THE INVENTION

Conventionally, when it is not desired to copy unnecessary pages or pages containing a confidential item of a plurality of sheets of originals, it is necessary to perform the copy after removing these pages manually. In addition, after the copy, it is also necessary to perform an operation of returning these pages.

For example, in Japanese Laid-Open Patent Publication No. 2000-147943, when OHP paper for presentation and materials for distribution are printed, a cover, an interleaving paper, a back cover, a content, and the like, which are unnecessary to copy, are specified, respectively, so as to perform the copy pages other than these pages.

Moreover, Japanese Laid-Open Patent Publication No. 8-125838 discloses a facsimile apparatus which recognizes a page number of each page of image data of read originals or received originals and rearranges in the order of page number, thereby performing output after arranging in the proper order of pages even when the order of pages of the originals is out of order.

In addition, Japanese Laid-Open Patent Publication No. 2005-153326 discloses an image forming apparatus which recognizes a barcode of identification information of read originals and changes the output order of each original data based on the identification information, thereby performing output after arranging in the proper order of pages even when the order of pages is out of order (Japanese Laid-Open Patent Publications Nos. 2000-147943, 8-125838, and 2005-153326).

The Japanese Laid-Open Patent Publication No. 2000-147943 described above indicates a special case where copy for presentation is performed, in addition, only specific pages can be removed.

Moreover, in the Japanese Laid-Open Patent Publications Nos. 8-125838 and 2005-153326 described above, when copies in a specific range of original images made of a plurality of sheets is desired, it is necessary to pick the page up from the originals to copy, which does not reduce a burden on a user.

SUMMARY OF THE INVENTION

An object of the present invention is to provide an image forming apparatus, a method for forming an image, and a program which pick only a necessary page up from a plurality of originals and aligns the originals in an order of pages to copy so as to reduce a work burden on a user.

The image forming apparatus and the method for forming an image of the present invention have a following structure.

The image forming apparatus of the present invention has a copy function, and includes an identification information extracting portion for extracting identification information (page number and heading information) which identifies originals from image data of read originals while reading the originals or after reading all of the originals, a selecting portion for accepting the identification information selected from the extracted identification information which is displayed by a user as a target for image formation, and an output portion for printing image data excluding the identification information from image data corresponding to the target for image formation accepted by the selecting portion.

Furthermore, the output portion may perform printing after the page number is aligned based on the page number extracted by the identification information extracting portion.

As the identification information, code information formed by a two-dimensional code, an RFID (Radio Frequency-Identification) tag, or the like is preferably used.

Furthermore, a method for forming an image of the present invention, which is used in an image forming apparatus having a copy function, includes an identification information extraction step of extracting identification information (page number and heading information) which identifies originals from image data of read originals, a selection step of accepting a target for image formation selected by a user based on the extracted identification information, and an output step of printing image data corresponding to the target for image formation accepted at the selection step.

Furthermore, a program which is created to cause a computer to function as each portion of the image forming apparatus having the structure described above may be executed by the computer.

BRIEF DESCRIPTION OF THE DRAWINGS

FIG. 5 shows a data structure and a data example of a management table storage portion;

FIG. 12 shows a data example of a management table storage portion for the selection result;

FIG. 14 shows an example of a display of the selection screen in which selection for each page is possible;

FIG. 17 shows a data example of the management table storage portion when an order of pages is wrong and after an original in which identification information is missing is read; and FIG. 18 shows a data example of the management table storage portion when the data example of FIG. 17 is arranged in an order of page number.

PREFERRED EMBODIMENTS OF THE INVENTION

Now, referring to the accompanying drawings, preferred embodiments according to the present invention will hereinafter be described.

Figure 1:
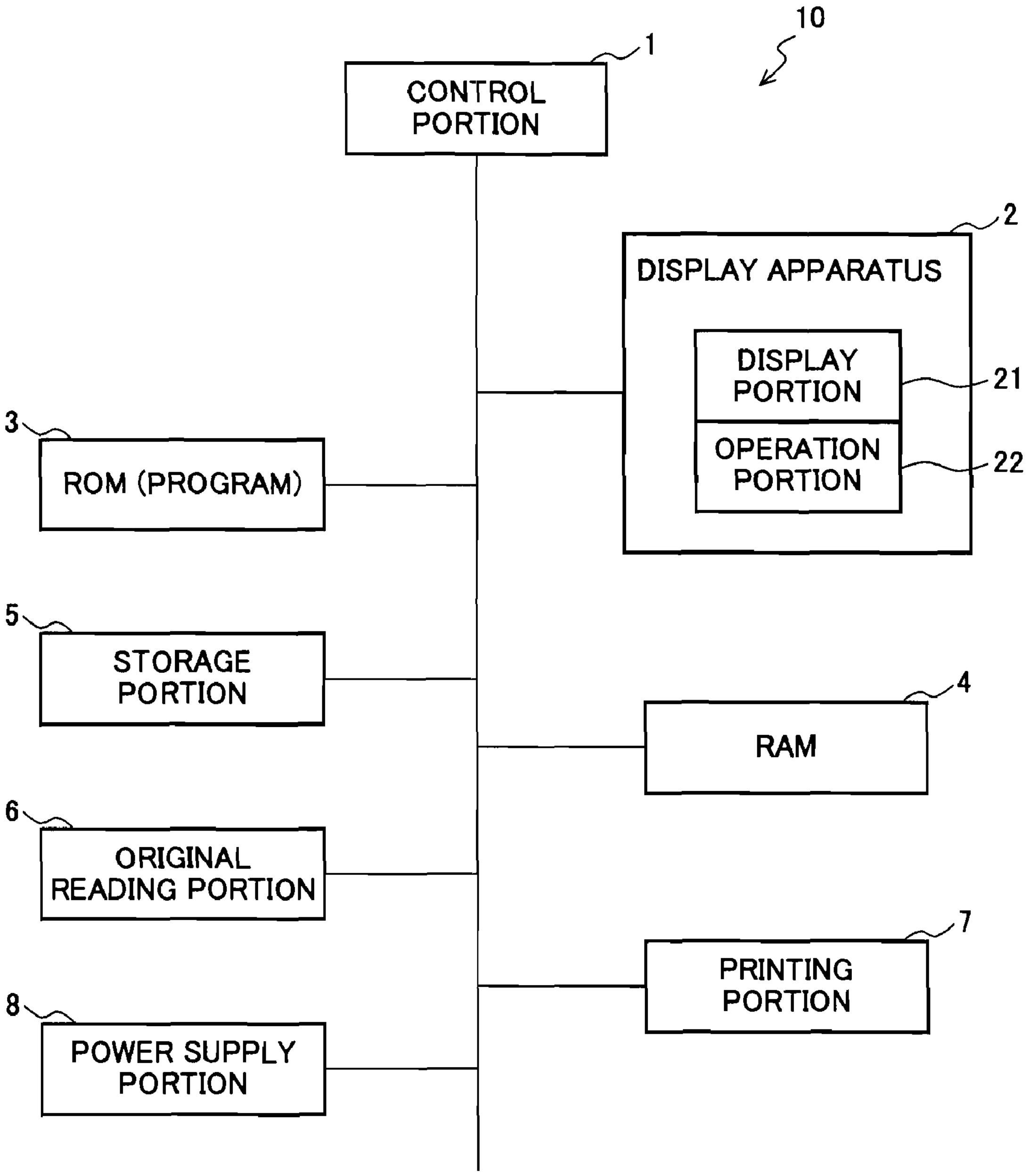
FIG. 1 is a block diagram showing a schematic structure of a copier as an image forming apparatus according to an embodiment of the present invention.

FIG. 1 is a block diagram showing a schematic structure of a copier as an image forming apparatus according to an embodiment of the present invention. Note that, although description will be given using a copier here, any image forming apparatus with a print function, a scanner function, a copy function, and the like is applicable.

Figure 2:
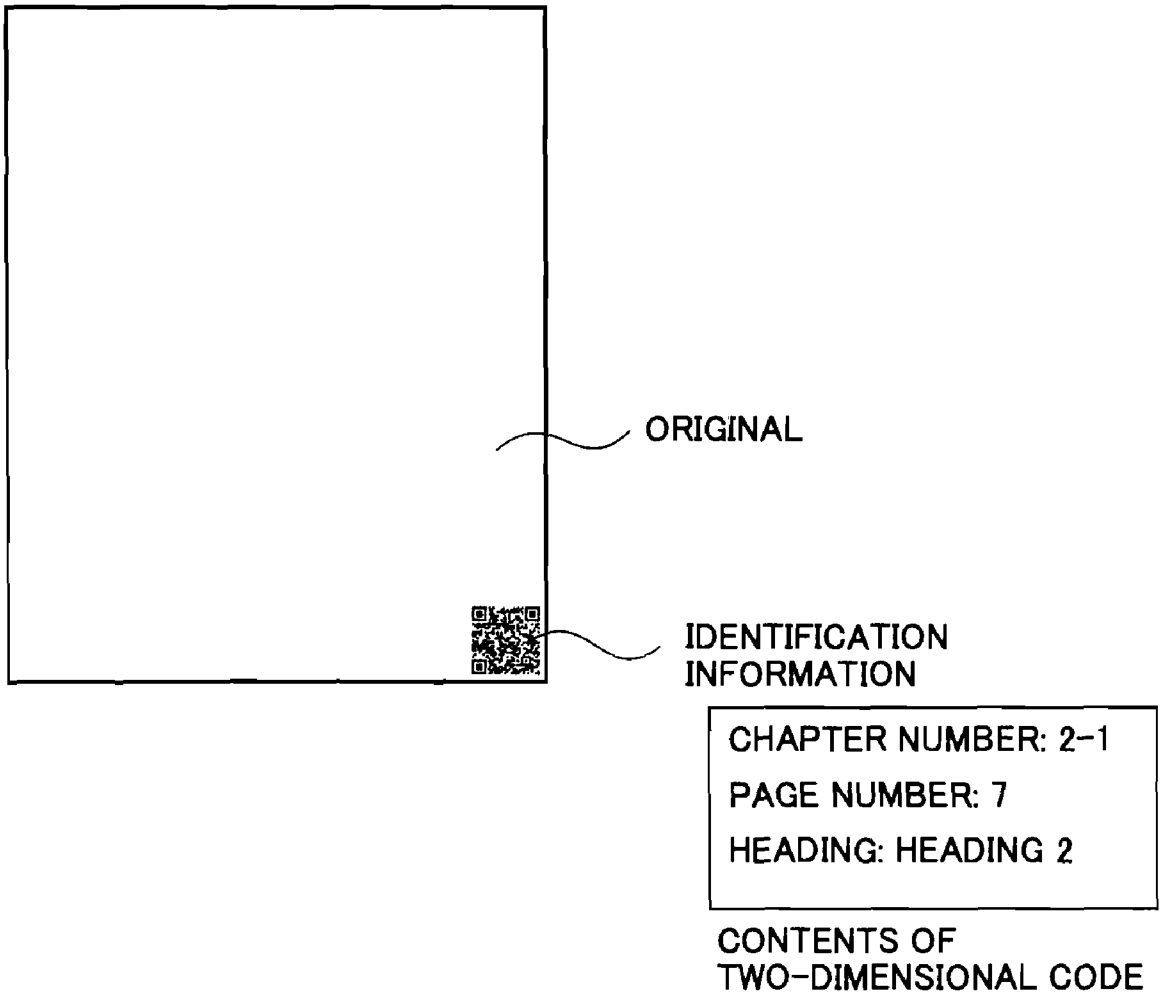
FIG. 2 is a structural view of an original to be read.

In addition, on a copy original handled by the copier, identification information (for example, a chapter number, a page number, a heading, an original name, and the like) for identifying each original is printed at a specific position in a margin of the copy original sheet in a form of a two-dimensional code (for example, a QR code (registered trademark)). For example, as shown in FIG. 2, the identification information is printed with the two-dimensional code in a margin of the lower right side of the original. The identification information may be printed at any position as far as it is determined in advance.

Moreover, resolution (standard/super fine/ultra fine), color (monochrome/color), mode (1-side reading/2-side reading), and the like, which are conditions when each original is read, may be printed as reading information together with the identification information in the two-dimensional code. Thereby, it is not necessary for a user to set a reading condition in each case when originals are read.

In FIG. 1, an image forming apparatus (copier) 10 is comprised of a control portion 1, a display apparatus 2, a ROM (Read Only Memory) 3, a RAM (Random Access Memory) 4, a storage portion 5, an original reading portion 6, a printing portion 7, and a power supply portion 8.

The control portion 1 executes a control program stored in the ROM (Read Only Memory) 3 by a CPU (Central Processing Unit) or an MPU (Micro Processing Unit) to control the operation of the copier 10.

Figure 3:
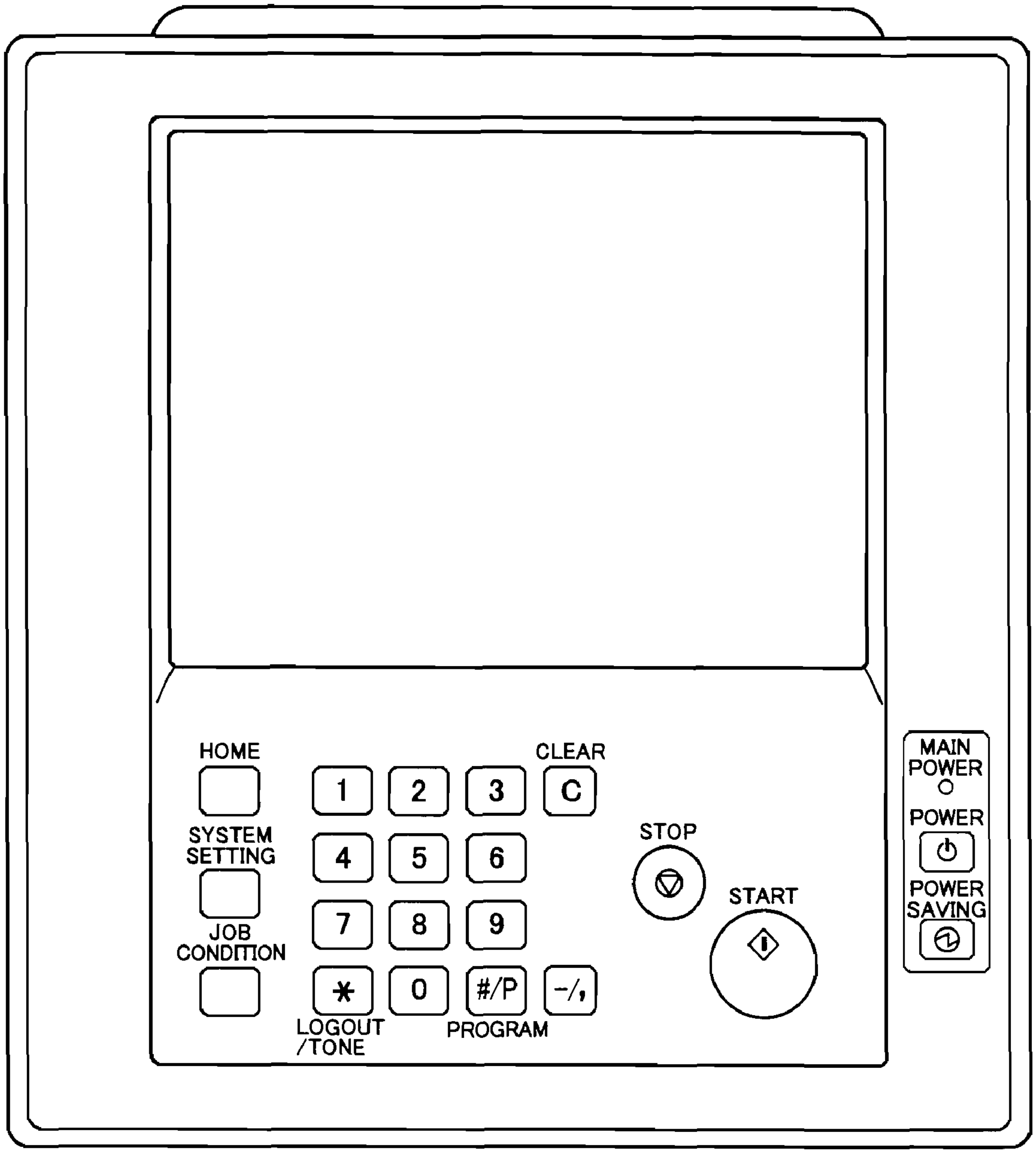
FIG. 3 is an external view of a display apparatus of the copier.

The display apparatus 2 is comprised of a display portion 21 and an operation portion 22 (FIG. 3).

The display portion 21 is comprised of, for example, a touch panel display on which, in addition to a specification screen and a setting screen for various kinds of functions, operational states of the copier 10, various kinds of messages, and the like are displayed.

Moreover, the operation portion 22 is comprised of various kinds of operation keys or switches, and a touch panel. A user is capable of specifying setting about copy and execution of copy by operating the touch panel, various kinds of operation keys or switches.

The ROM 3 is a memory for storing a control program that controls a whole of the copier 10.

The RAM (Random Access Memory) 4 is a work memory used when the control program is in execution.

The storage portion 5 is comprised of, for example, a large-capacity nonvolatile storage apparatus such as a hard disc, in which image data of an original read by the original reading portion 6, various kinds of setting information, management data, and the like are stored.

The original reading portion 6 separates originals one by one from a bundle of originals placed on an original table and scans by a scanner to obtain as image data.

The printing portion 7 applies image processing to image data to print on recording paper based on an instruction from the control portion 1.

The power supply portion 8 supplies electricity to the copier 10.

Next, an operation of the present invention will be described.

Figure 4:
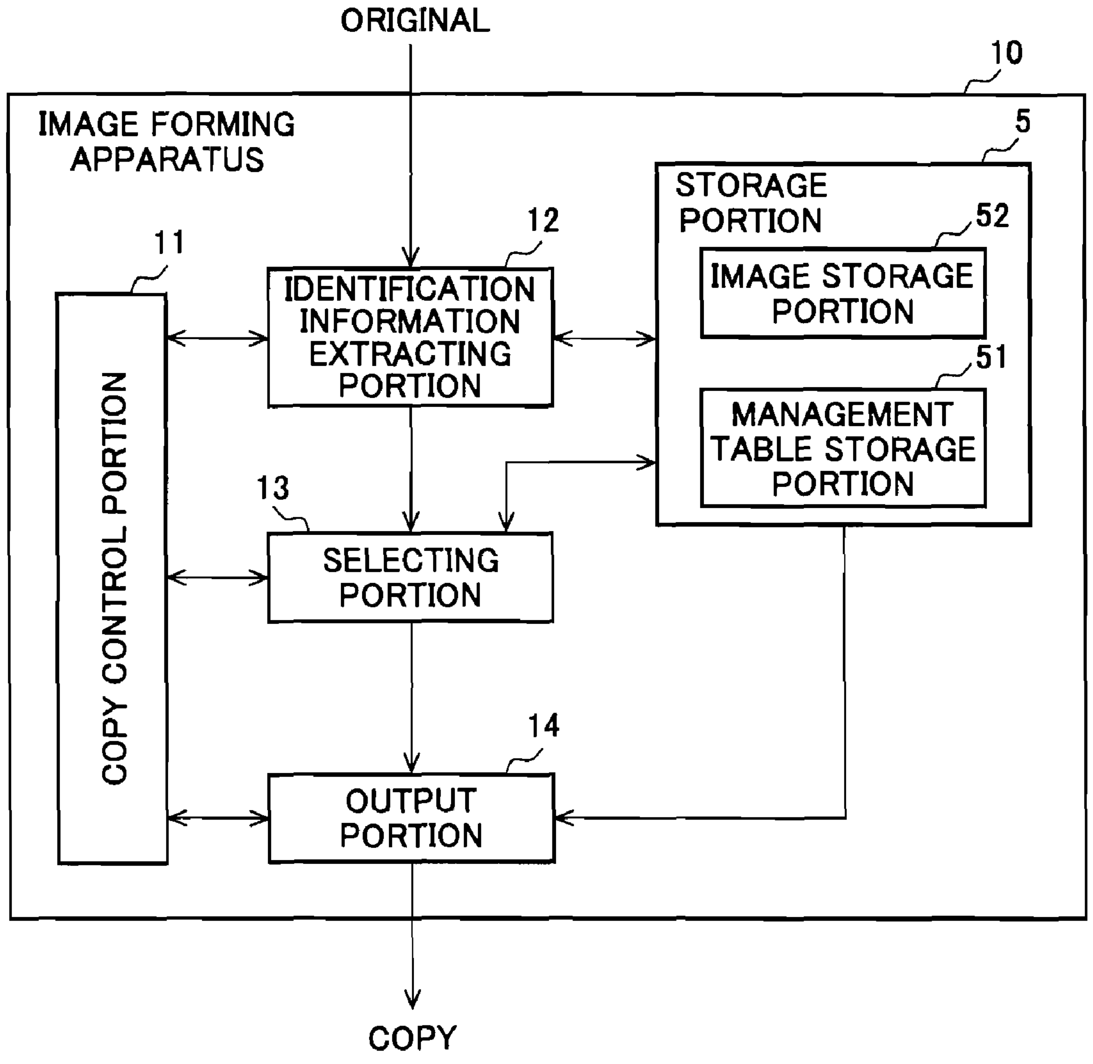
FIG. 4 is a block diagram showing a control structure of the image forming apparatus according to an embodiment of the present invention.

FIG. 4 is a block diagram showing a control structure of an image forming apparatus according to an embodiment of the present invention, wherein the image forming apparatus 10 is comprised of the storage portion 5, a copy control portion 11, an identification information extracting portion 12, a selecting portion 13, and an output portion 14.

In addition, the storage portion 5 secures areas of a management table storage portion 51 and an image storage portion 52.

The copy control portion 11 controls the identification information extracting portion 12 for reading originals to extract identification information, the selecting portion 13 for displaying/selecting a page which is necessary for current copy among read originals, and the output portion 14 for copying the selected page, so as to control a copy function in the present embodiment.

Processing of extracting identification information is performed in the order of (1) extraction of an image of a two-dimensional code and (2) extraction of identification information, as described below.

(1) Extraction of an Image of a Two-Dimensional Code:

An image of a two-dimensional code included in read image data is extracted, for example, when an existence position of the two-dimensional code is determined in advance, by determining a position coordinate of a rectangle surrounding the image of the two-dimensional code at the position. In addition, even when an existence position of the image of the two-dimensional code is not determined on an original, it is possible to extract by determining a position coordinate of a rectangle surrounding the image of the two-dimensional code with a known technology.

(2) Extraction of Identification Information:

The image of the two-dimensional code in the determined rectangle is decoded in accordance with predetermined code decoding algorithm to obtain decoded contents from the two-dimensional code.

In the image of the two-dimensional code, labels such as a chapter number, a page number, and a heading, and a break symbol ":" are followed by each data, for example, like "chapter number: 2-1, page number: 7, heading: heading 2".

Next, a chapter number, a page number, and a heading corresponding to each label are extracted as data from the decoded contents based on labels. When any of the labels does not exist, a value of no data is applied for the label.

Resolution (standard/super fine/ultra fine), color (monochrome/color), mode (1-side reading/2-side reading), and the like, which are conditions when each original is read, may be printed as reading information together with the identification information in the two-dimensional code so that the reading conditions are also extracted when the identification information is extracted.

Then, as processing result, the following two kinds of information are output.

(1) Existence or Nonexistence of Identification Information:

When no two-dimensional code exists, or when a two-dimensional code exists but no corresponding label exists, information showing that no identification information exists is output.

Alternatively, when a two-dimensional code exists and at least one corresponding label exists, information showing that identification information exists is output.

(2) Output of Identification Information:

When at least one label corresponding to identification information exists, each label and data corresponding thereto are output.

The management table storage portion 51 stores the data structure having the data items as illustrated in FIG. 5 for each image data read from originals.

Image data number (No.): A value of counter for image data numbered in the order of reading. Even when an original whose identification information is invalid is read, the value of counter is counted up.

Chapter number: A chapter number of each page (one information of identification information). The chapter number may be in an arbitrary form including a section number.

Page number: A consecutive number of each page (one of information of identification information). The page number is a running number numbered for the entire originals.

Heading: Heading showing category of each page (one information of identification information), such as "cover", "content", "heading number", "summary", "back cover", and the like. The heading may be expressed in numbers which are numbered in the order that a heading appears (for example, "1", "10", and the like), or may be expressed in titles put to chapters or sections.

With respect to the originals in which no identification information exists, as it means that an invalid original is mixed in the read originals, the management table storage portion 51 ignores the originals without storing.

File name of image data: A name of a file in which image data of each page is stored. The image data is stored with a file name which is an exclusive name in the image storage portion 52.

Selection flag: When a user selects a page that the user wants to copy, "1" is stored for the page, and "0" is stored for a not-selected page.

In FIG. 5, in data items of a chapter number and a heading, columns indicated by "-" show that there is no entry in identification information.

In addition, in data items of a chapter number, a page number and a heading, columns indicated by "END" show that there is no corresponding image data, that is, the originals have 22 pages.

Figure 6:
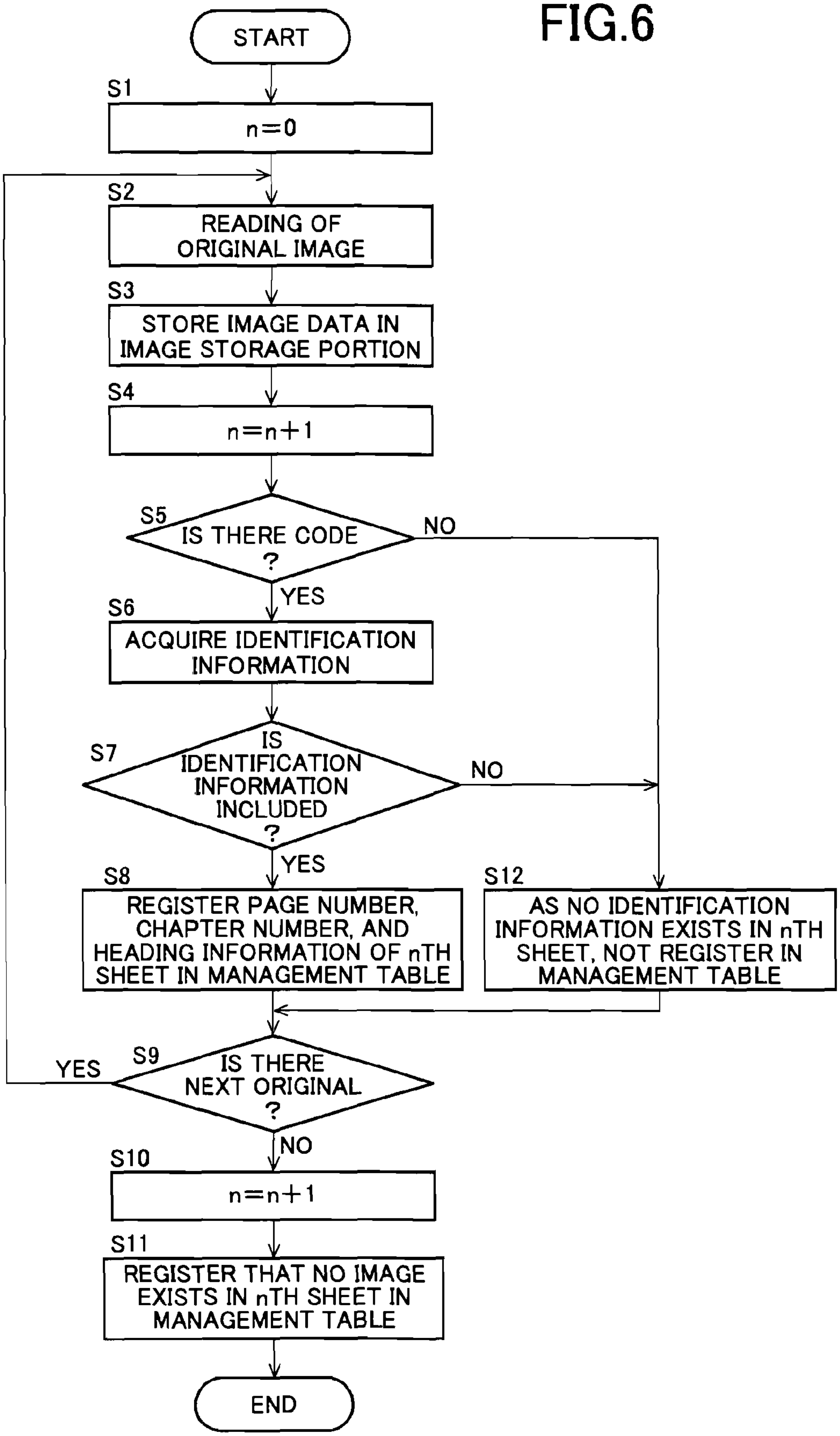
FIG. 6 is a flowchart showing an operation of an identification information extracting portion.

Next, an operation of the identification information extracting portion 12 will be described using the flowchart of FIG. 6.

When a user sets an original on an original table and operates the operation portion 22 so that the copy control portion 11 receives an instruction of reading, the identification information extracting portion 12 is activated.

The identification information extracting portion 12 clears a counter n for counting the number of originals into zero (step S1), and the originals are read by the original reading portion 6 while sequentially feeding (step S2). Here, when an instruction of 2-side reading is given by the user, images on the front and rear sides of the originals are treated as separate images.

Read image data is sequentially stored with an exclusive file name in the image storage portion 52 (step S3), and the counter n is counted up to manage the number of reading originals (step S4).

Next, whether or not a two-dimensional code exists in the read image data is analyzed, and when no two-dimensional code exists (in the case of NO at step S5), the procedure proceeds to step S12.

Alternatively, when a two-dimensional code exists (in the case of YES at step S5), identification information is extracted from the two-dimensional code (step S6), and when no identification information is included (in the case of NO at step S7), and the procedure proceeds to step S12.

Alternatively, when identification information is included in the two-dimensional code (in the case of YES at step S7), a value of the counter n as an image data number, a chapter number, a page number, a heading, a name of a file in which the read image data is stored, and "zero" as a selection flag are newly registered in the management table storage portion 51 (step S8), and the procedure proceeds to step S9.

When any of the chapter number, the page number and the heading is not included in the identification information, the values thereof are registered as values of nonexistence.

On the other hand, when no two-dimensional code exists (in the case of NO at step S5), and when no identification information exists (in the case of NO at step S7), the procedure proceeds to step S9 without registering in the management table storage portion 51 (step S12).

Next, existence or nonexistence of a next original to be read is confirmed (step S9), and when there is an original to be read, the procedure returns to step S2 to continue reading of the next original.

When there is no original to be read (in the case of NO at step S9), the counter n is counted up (step S10), information showing that no image exists in the Nth sheet ("END") is registered in the management table storage portion 51 (step S11), and the processing is terminated.

In this way, when reading of all originals is completed, in the example of FIG. 5, information of 22 sheets of originals having identification information is stored in the management table storage portion 51.

The example of FIG. 5 shows that, concerning an original whose image data number is "1", a heading of "cover" and a page number of "1" are extracted, image data of the cover is written into a file named "file 1", and "zero" is set to a selection flag as identification information.

Moreover, the example of FIG. 5 shows that, concerning an original whose image data number is "4", a chapter number of "1", a page number of "4", and a heading of "heading number 1" are extracted, image data of the page is written into a file named "file 4", and "zero" is set to a selection flag as identification information.

Next, when reading of all originals to be copied is completed, the copy control portion 11 activates the selecting portion 13.

Figure 7:
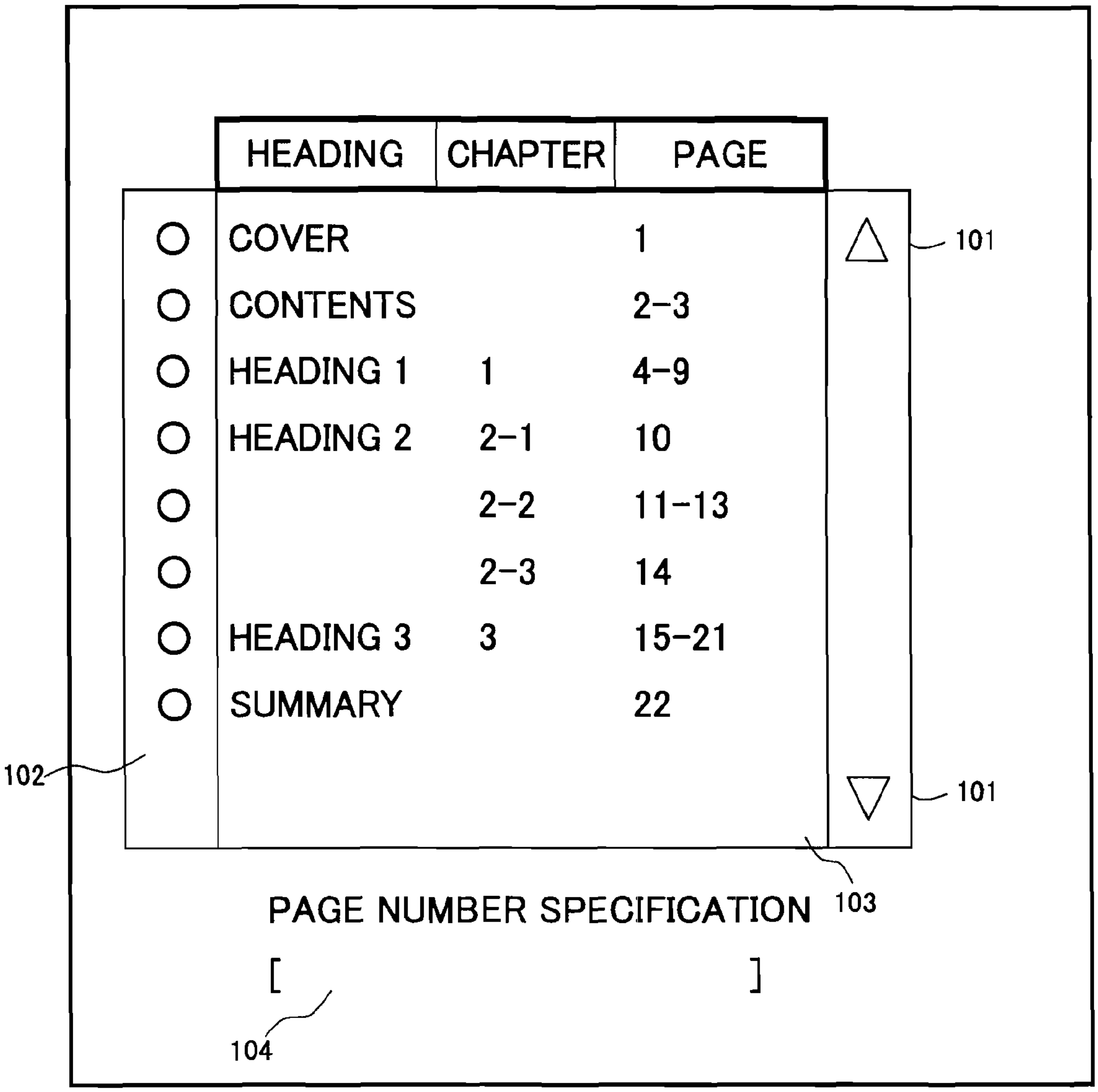
FIG. 7 shows an example of a display of an (initial) selection screen.

After the activation, the selecting portion 13 displays identification information stored in the management table storage portion 51 on a selection screen as illustrated in FIG. 7.

In FIG. 7, 101 denotes a scroll button for scrolling a screen up and down when items to be displayed can not be displayed, and 102 denotes a radio button for showing an item that a user selects for copy, where a mark of "○" shows non-selection, and when an item is selected by a user, "○" changes into "•" to show that the item is selected.

103 denotes an area displaying the detailed structure of identification information of read image data, wherein identification information is classified into each item of "heading", "chapter number", and "page number" and displayed in an order of reading. In addition, each item is selectable by touching.

In 104, a page number corresponding to the item selected in 103 is displayed, and when the displayed page number is modified and a decision button is pressed, it is possible to input a specific page number that a user wants to select.

Next, a method for selecting a page that a user wants to copy will be described using the selection screen.

For example, in the example shown in FIG. 5, it is assumed that pages having image data numbers of 10, 11, 12, 13, 15, 16, and 20 (corresponding to 10, 11, 12, 13, 15, 16, and 20 in the case of page numbers shown by identification information) are selected and copied.

Figure 8:
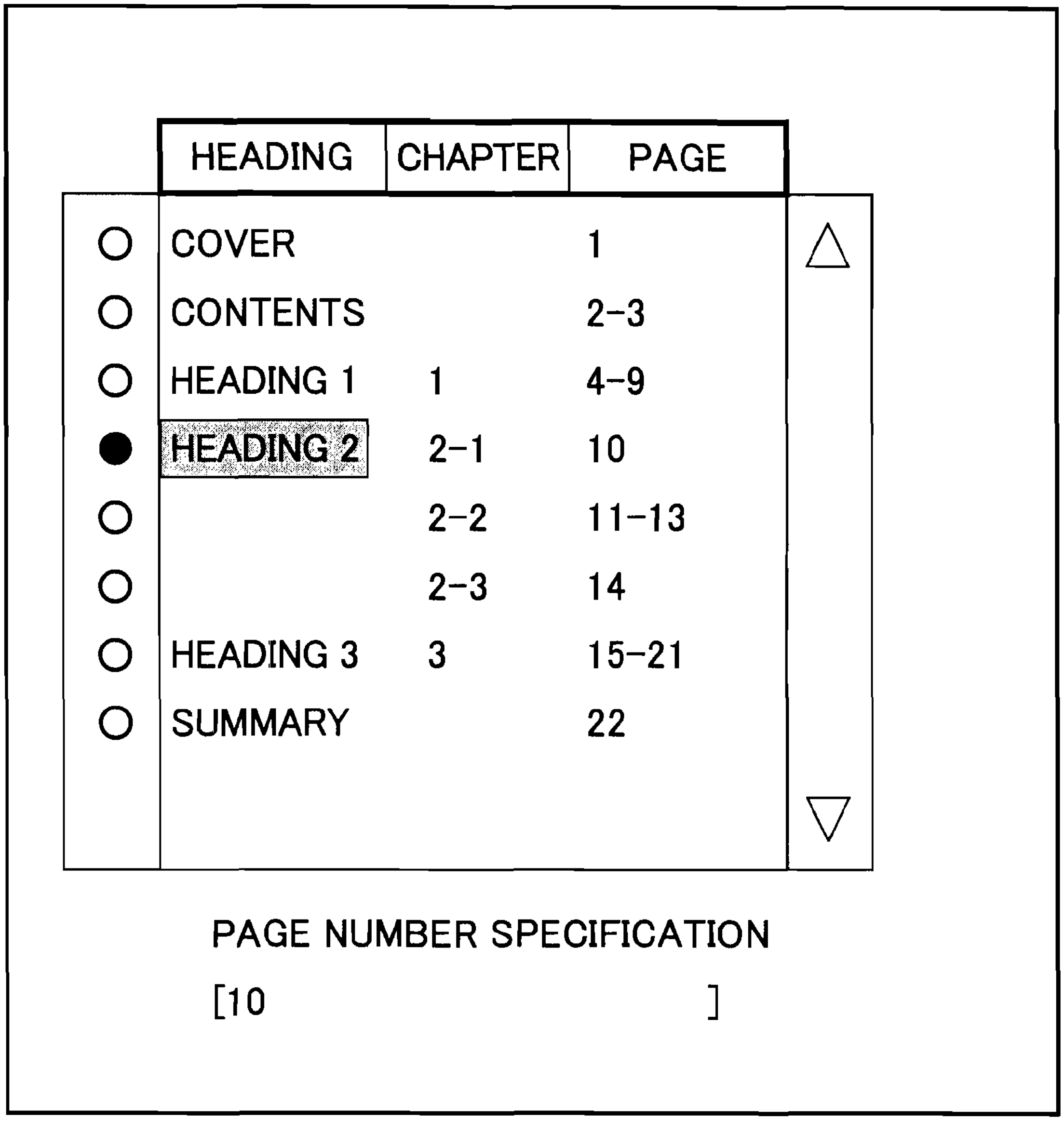
FIG. 8 shows an example of a display of a selection screen reflecting selection of a user (“heading 2”)

In the selection screen of FIG. 7, when a user touches and selects "heading 2" that the user wants to copy (a chapter number "2-1" or a page number "10" may be selected), as illustrated in FIG. 8, the selected "heading 2" is highlighted and the corresponding radio button 102 changes from "○" into "•", and a page number "10" corresponding to the "heading 2" is displayed in the area of page number specification 104.

Figure 9:
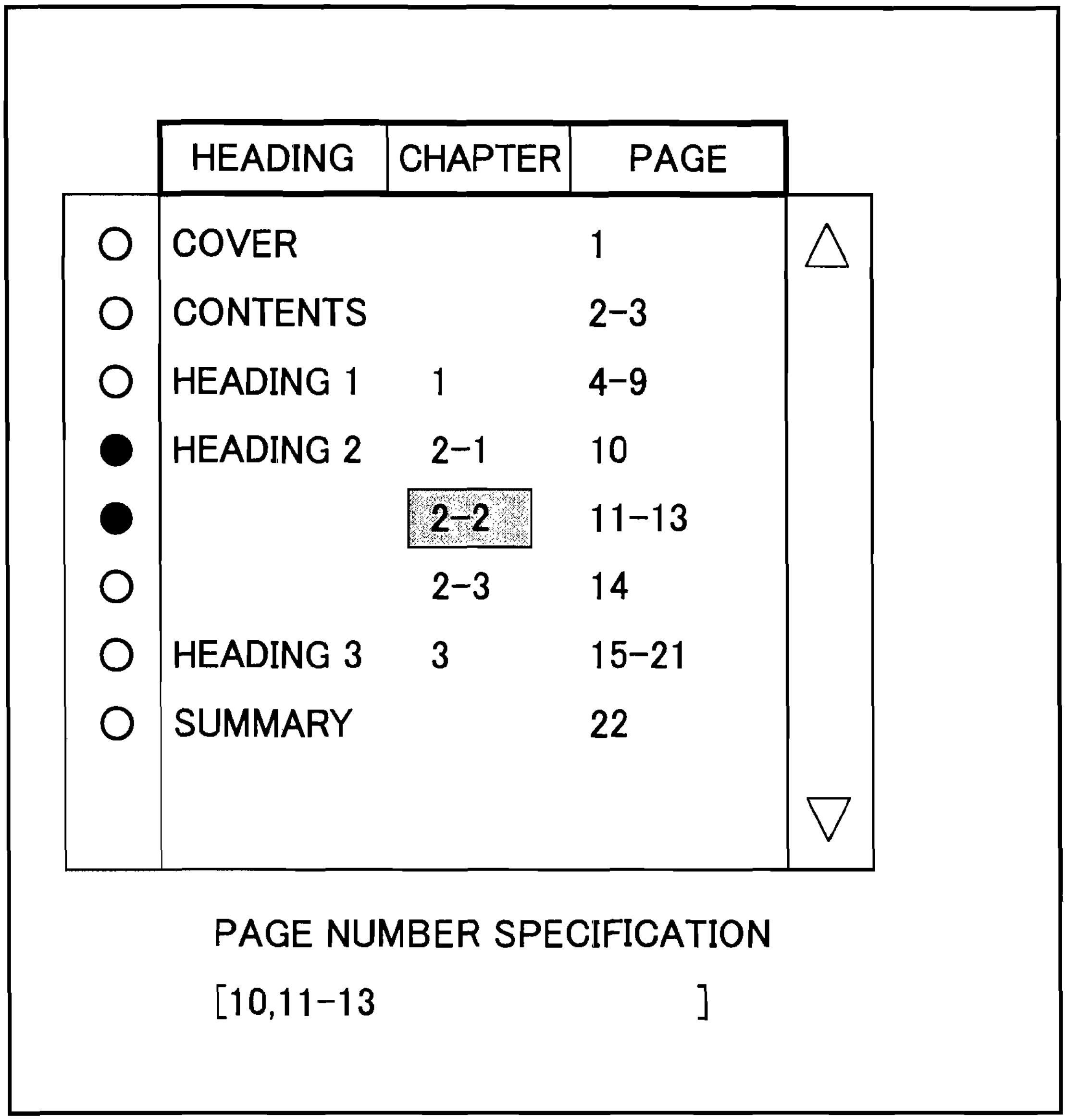
FIG. 9 shows an example of a display of the selection screen reflecting selection of a user (chapter “2-2”)

Next, in the display example of FIG. 8, when a chapter number "2-2" that the user wants to copy is touched and selected (a page number "11-13" may be selected), as illustrated in FIG. 9, the selected chapter number "2-2" is highlighted and the corresponding radio button 102 changes from "○" into "•", and a page number "11-13" corresponding to the chapter number "2-2" is added and "10, 11-13" is displayed in the area of page number specification 104.

Figure 10:
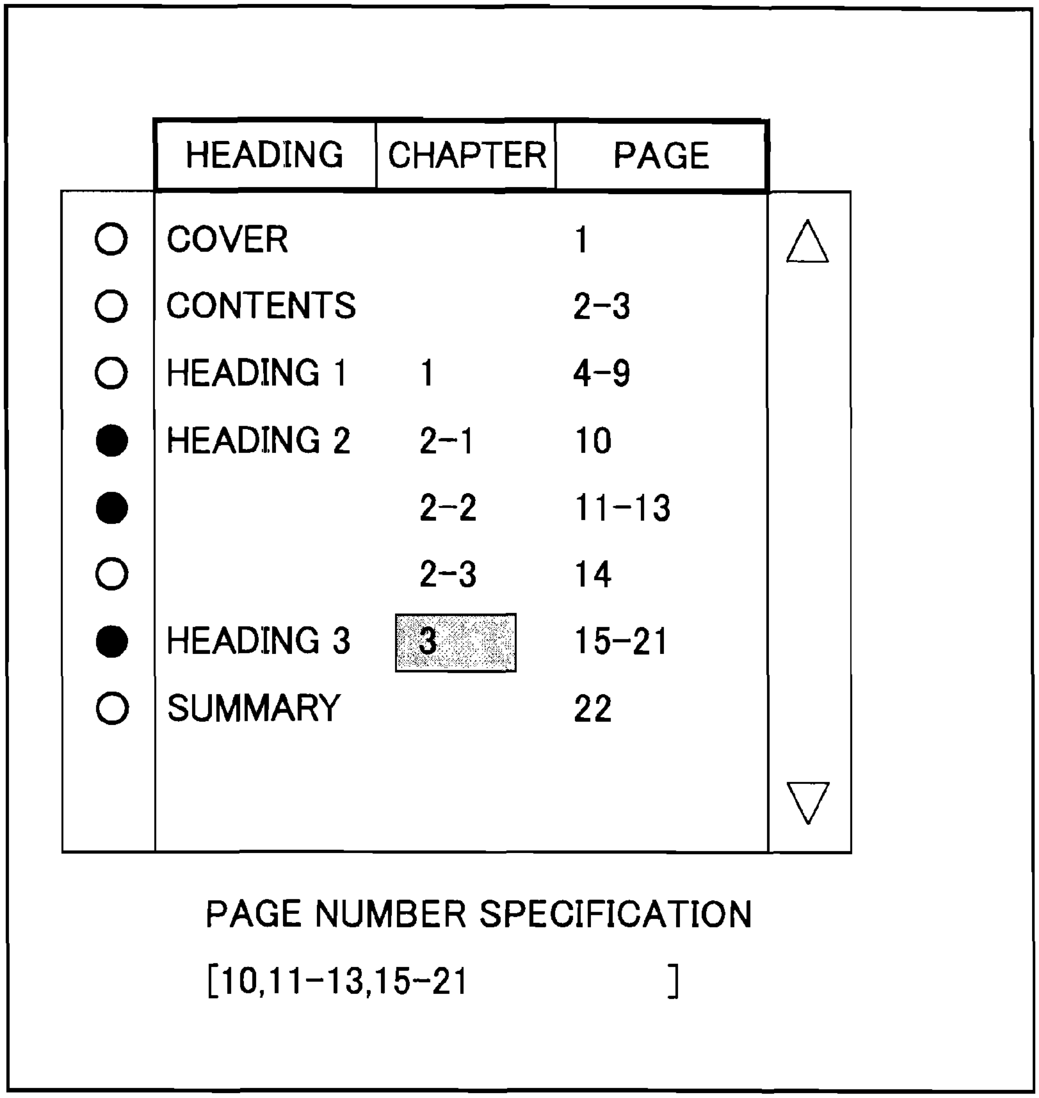
FIG. 10 shows an example of a display of the selection screen reflecting selection of a user (chapter “3”)

Next, in the display example of FIG. 9, when a chapter number "3" that the user wants to copy is touched and selected (a heading "heading 3" or a page number "15-21" may be selected), as illustrated in FIG. 10, the selected chapter number "3" is highlighted and the corresponding radio button 102 changes from "○" into "•", and a page number "15-21" corresponding to the chapter number "3" is added and "10, 11-13, 15-21" is displayed in the area for page number specification 104.

Figure 11:
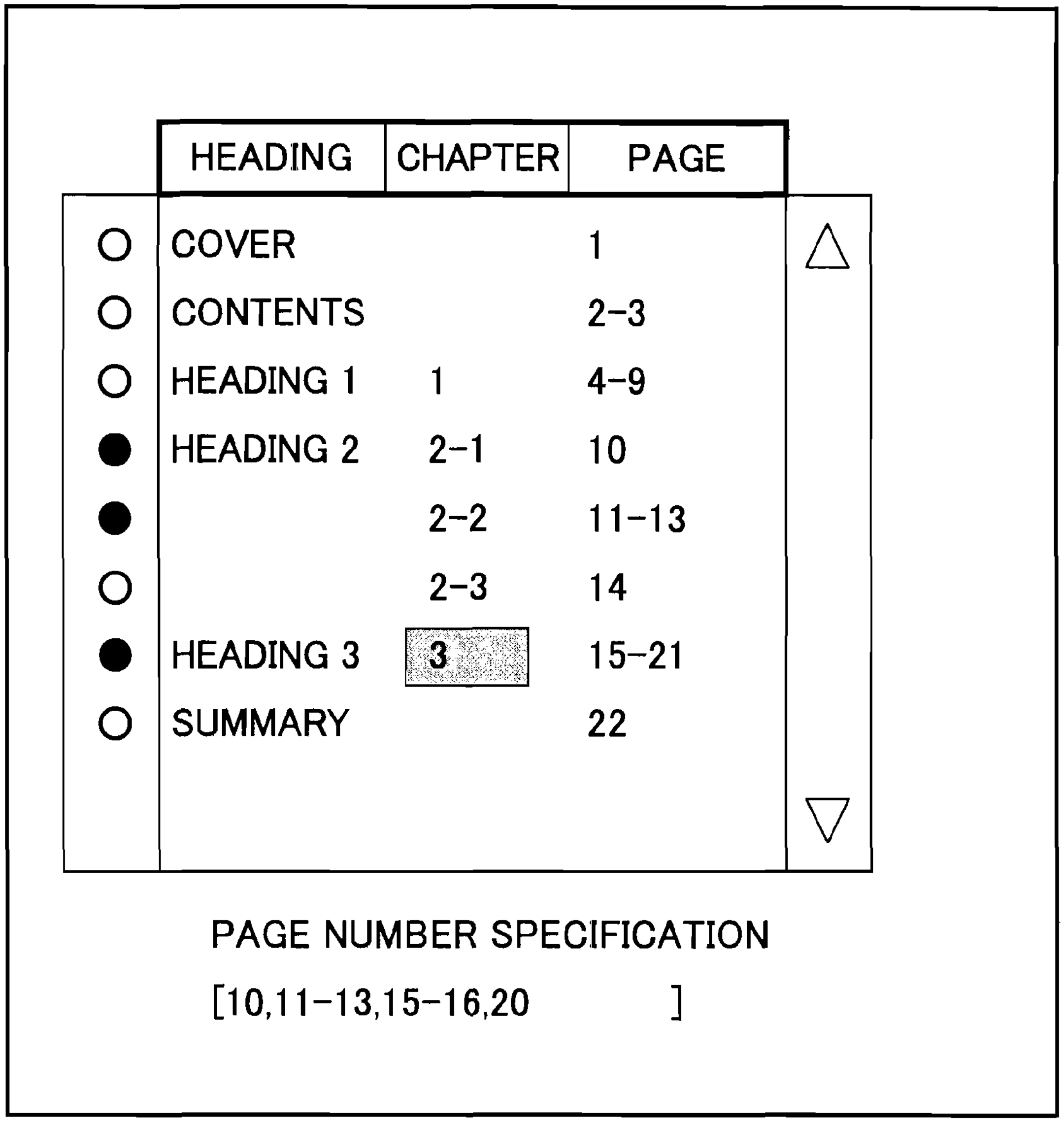
FIG. 11 shows an example of a display of the selection screen when an area for page number specification is modified and desired pages are selected.

At this phase, image data numbers "17" through "19" (page numbers "17" through "19") that the user does not want are selected more than necessary. In such a case, in FIG. 10, after touching and selecting the area of page number specification 104, the user operates the operation portion 22 (FIG. 3), modifies "15-21" into "15-16, 20" as illustrated in FIG. 11, and presses the decision button, whereby it is possible to specify the originally desired pages.

The mark "-" between numbers means "to", and "15-21" has the same effect as the effect of specifying numbers between "15" to "21", that is, "15, 16, 17, 18, 19, 20, 21" individually. Accordingly, in the case of "15-16, 20", it is the same with inputting as "15, 16, 20".

The selecting portion 13 sets the selection flag corresponding to the selected pages to "1" with respect to the items or pages selected by the operation described above and updates the management table storage portion 51.

In the case of the example described above, as illustrated in FIG. 12, the selection flag corresponding to the selected pages is set to "1" and the management table storage portion 51 is updated.

In addition, desired pages may be dragged as follows to select all items therebetween. The dragging refers to touching a first item and moving a finger to the last item while touching.

Figure 13:
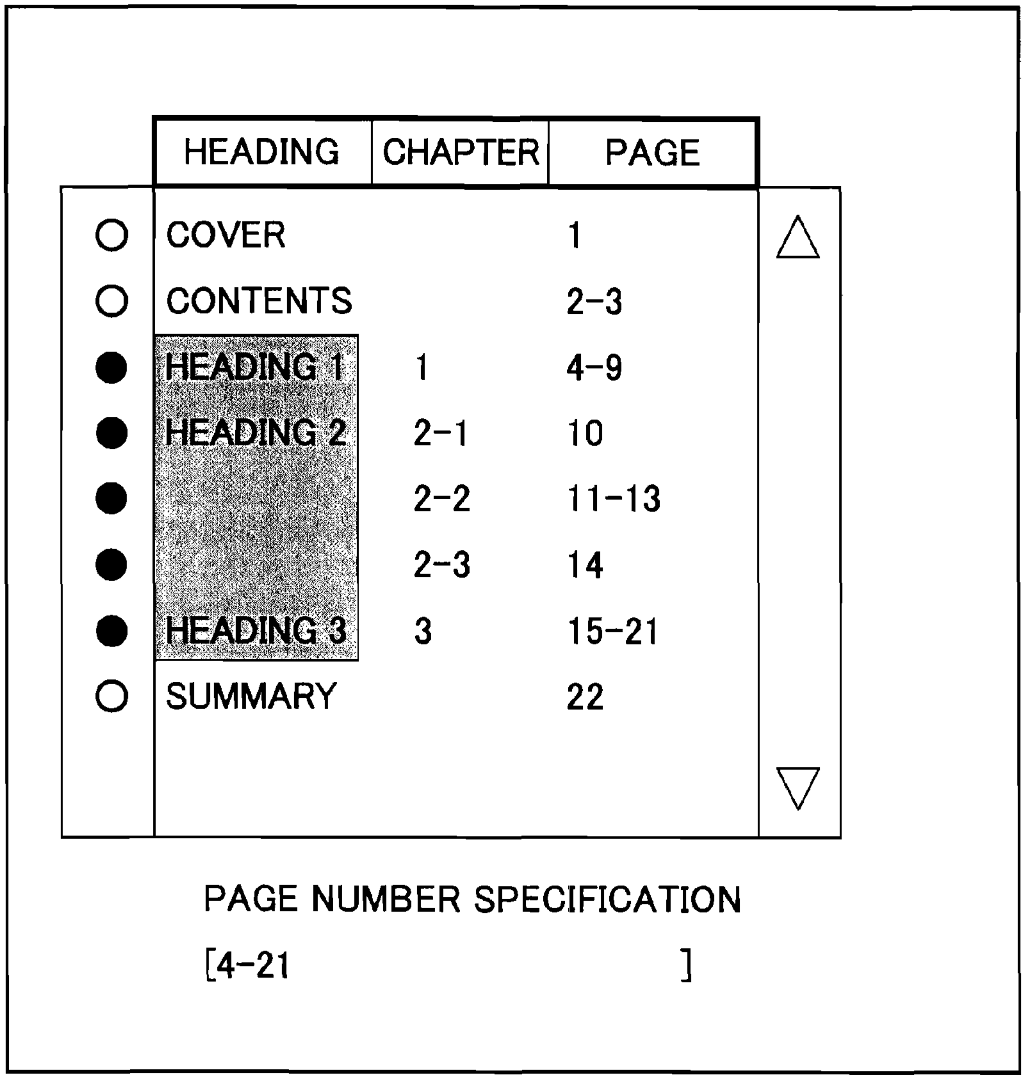
FIG. 13 shows an example of a display of the selection screen reflecting selection of a user (dragging)

In the (initial) selection screen of FIG. 7, when selecting all chapters 1 to 3, as shown in FIG. 13, dragging is performed from "heading 1" to "heading 3" (may be chapter "1" to chapter "3").

Also in this case, since the radio buttons 102 corresponding to the items which have been dragged change from "○" into "•", it is possible to recognize that selection setting for copy is made, and since "4-21" is displayed in the area of page number specification 104, it is possible to recognize that pages 4 to 21 are selected.

As described above, when copying for each heading or chapter is desired, by selecting corresponding items in the area displaying the detailed structure 103, pages that the user wants can be copied, and what is selected can be recognized at a glance by the state of the radio button 102.

Moreover, a specific page can be selected by modifying the area of page number specification 104.

Moreover, although the example which displays organizing into each heading or chapter has been used in the description described above, a display in which a user can select page by page may be used as shown in FIG. 14.

Figure 15:
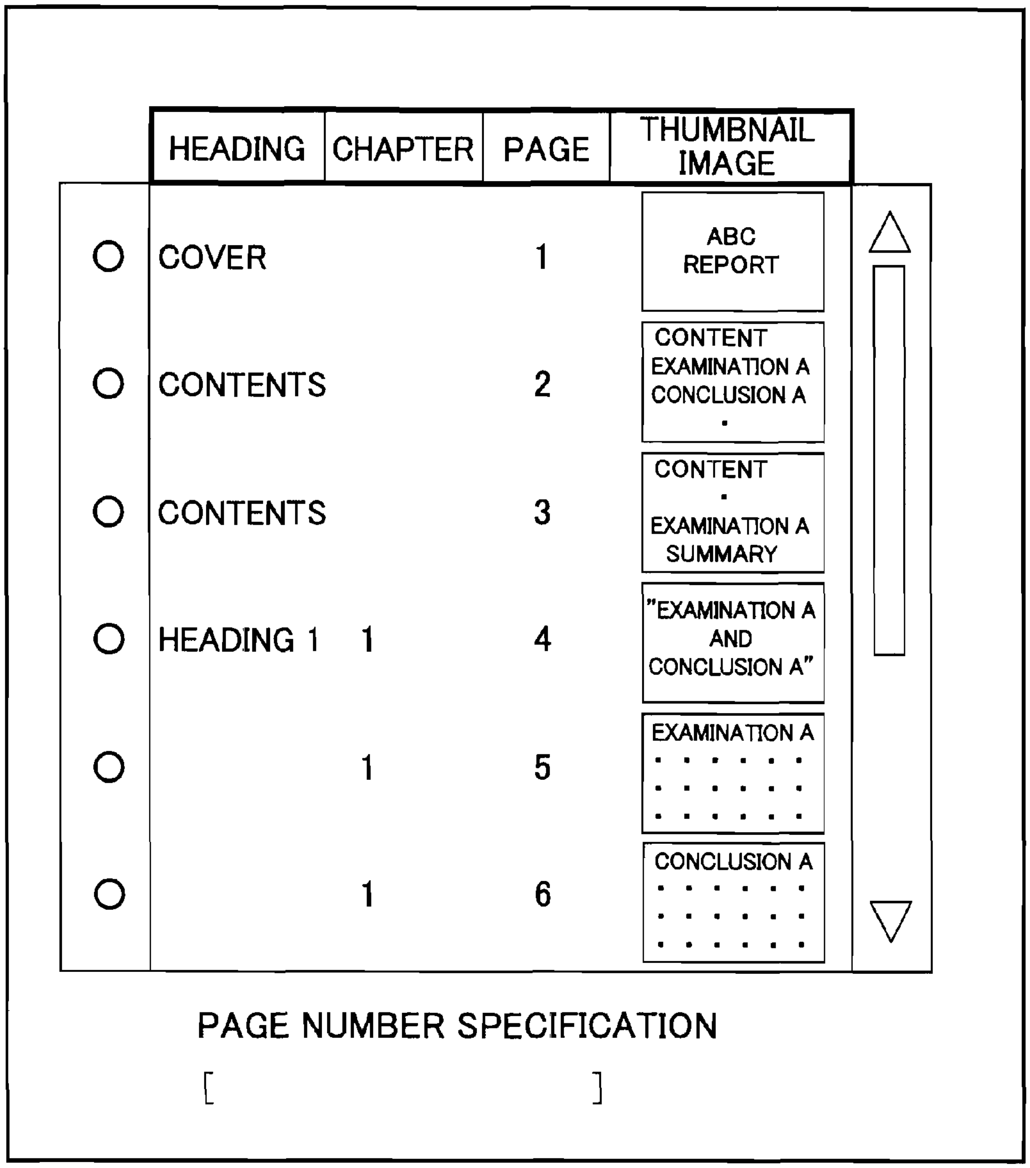
FIG. 15 shows an example of a display of the selection screen on which thumbnail images are displayed for each page.

Further, when displaying page by page, thumbnail images may be generated based on read image data as shown in FIG. 15 and displayed simultaneously so that the user can select pages intuitively.

Note that, also when selecting pages in these cases, it is certainly possible to use the method described above.

As described above, after the user selects pages that the user wants to copy from identification information displayed on the display portion 21, the user presses a start key of the operation portion 22 to copy. When the start key is pressed, the copy control portion 11 terminates the execution of the selecting portion 13 and activates the output portion 14.

The output portion 14 picks up image data whose selection flag stored in the management table storage portion 51 is "1" from the image storage portion 52, and causes the printing portion 7 to print images in which two-dimensional code unnecessary for a copy is deleted.

The deletion of an image of the two-dimensional code is performed, for example, by a method that a pixel value of the dark section in an image of the two-dimensional code (an area where a graphic pattern exists) is replaced with an average density value of pixels existing around a dark section (that is, a background part).

By configuring the present embodiment as described above, it is possible to display identification information (chapter number, page number, and heading) extracted from read images of originals and copy pages that a user wants to copy, whereby it is not necessary to perform manual classification and pick-up in advance and ex-post insertion, which reduces a work burden on the user.

Moreover, since the identification information is formed by a two-dimensional code, recognition and extraction of the identification information are made easier, and it is possible to prevent reduction in a processing speed and to reduce a load on the image forming apparatus.

In addition, since a two-dimensional code printed on originals is deleted, it is possible to prevent deterioration in appearance of a copy.

In the identification information extracting portion 12 in the embodiment described above, identification information is extracted every time a sheet of originals is read, but identification information may be extracted from image data of read originals after reading all of the originals.

Figure 16:
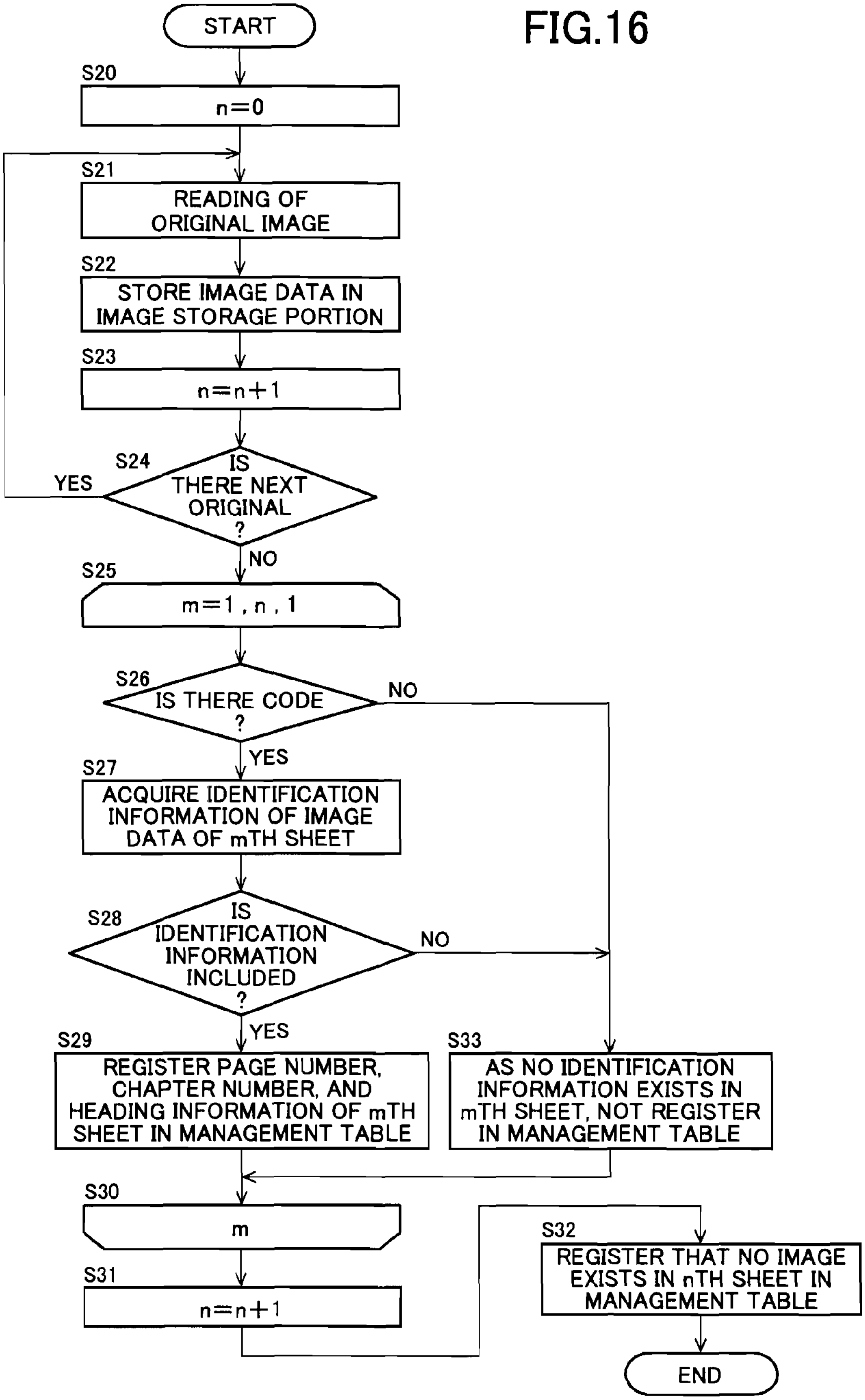
FIG. 16 is a flowchart showing another operation of the identification information extracting portion.

FIG. 16 is a flowchart illustrating a method for extracting identification information printed on originals after all of the originals are read.

In this method, first, while reading all of the originals, a file name of a file that image data of the read originals is written in the image storage portion 52 and an image data number are registered in the management table storage portion 51. Then, after reading of the originals is completed, identification information extracted from each image data is updated.

Subsequent processing in the selecting portion 13 and the output portion 14 are performed similarly to the above.

Next, description about the copy when an order of pages of originals to be read is replaced and when invalid originals having no identification information are mixed will be given.

When reading of all originals is completed, identification information is stored in the management table storage portion 51 as illustrated in FIG. 17.

Here, assuming that twelfth page of originals is accidentally put at the tenth sheet position, the original of twelfth page is stored in the management table storage portion 51 as the original having the image data number of "10". At this time, as identification information, a chapter number of "2-2" and a page number of "12" are extracted and set, image data of this page is written in a file named "file 10", and the selection flag is set to "zero".

Similarly, for the originals having image data numbers "11" and "12" whose order of pages is wrong, chapter numbers of "2-1" and "2-2", and page numbers of "10" and "11" are extracted and set as identification information, respectively, image data of these pages is written in files named "file 11" and "file 12", and the selection flag is set to "zero".

Moreover, when an original having no identification information is put at the twentieth sheet position, as shown in FIG. 17, the storing is performed without data of the image data number "20".

When reading of originals is completed, the copy control portion 11 rearranges the originals in the order of page numbers based on page numbers in the management table storage portion 51, and after updating the management table storage portion 51 as illustrated in FIG. 18, activates the selecting portion 13.

In the subsequent processing in the selecting portion and the output portion 14, as described above, using the updated management table storage portion 51, pages that the user wants to print are optionally selected and printed.

As described above, even if the order of pages is wrong when reading, it is possible to perform printing with the correct order of pages.

Moreover, since an original having no identification information is invalid and not stored in the management table storage portion 51, no invalid original is printed.

In addition, in the embodiment described above, although description has been given assuming that identification information is formed as a two-dimensional code and printed on originals, it is possible to apply similarly using an RFID tag.

In this case, the RFID tag is embedded at a predetermined position of recording paper for an original (for example, in a margin part in top, bottom, left, or right side of the recording sheet, or the like) and identification information (chapter number, page number, heading, and the like) is written so as to be capable of being taken out when creating the original, and the identification information extracting portion 12 reads the contents of the RFID tag by an RFID reader to extract the identification information.

Moreover, in the RFID tag, resolution (standard/super fine/ultra fine), color (monochrome/color), mode (1-side reading/2-side reading), and the like, which are conditions when each original is read, may be written as reading information together with the identification information so that the reading conditions are also extracted simultaneously when extracting of identification information.

Further, in the output portion 14, identification information may be output to the RFID tag of the recording paper to be copied and output, or nothing may be recorded. In addition, page numbers may be numbered again when identification information is output.

With this configuration, it is possible to acquire identification information at a high speed and it is not necessary to perform processing of deleting the identification information as the embodiment described above.

Moreover, when page numbers to be printed are known in advance, by setting the page numbers to be printed before reading originals and reading only originals having the set page numbers, image data of only originals required to be read is read, and it is possible to perform original feeding (skipping) at a high speed with respect to pages not required to be printed and to shorten the time of reading originals.

The present invention will not be limited to the embodiments described above, and various modifications and alterations may be certainly made within the scope of the present invention. For example, programs to function a computer are created as each portion of the image forming apparatus constituting the embodiments described above and written in a recording medium in advance, and the programs recorded in the recording medium are stored in a memory of the apparatus or a recording apparatus to execute the programs, whereby the object of the present invention is obviously attained.

In this case, the programs themselves read from the recording medium realize a function of the embodiments described above, and therefore the programs and the recording medium stored the programs thereon will also constitute the present invention.

In addition, the programs are also included when the function of the embodiments described above is realized by processing in combination with an operating system, other application programs, or the like, based on an instruction from the programs.

According to the present invention, since it is possible to pick only necessary pages up from a plurality of originals and align the originals in an order of pages to copy, it is not necessary to perform manual classification and pick-up in advance and ex-post insertion, which reduces a work burden on the user.

The invention claimed is:

1. An image forming apparatus having a copy function, comprising:

an identification information extracting portion configured to extract identification information from image data of read originals based on identification codes attached to the originals wherein the identification information extracting portion extracts the identification information while reading the read originals or extracts the identification information after reading all of the read originals;

a selecting portion configured to accept a target for image formation selected by a user by displaying a thumbnail image of each read original of the read originals which the identification information was extracted and the extracted identification information pairing with each other; and an output portion configured to print image data with the exception of the identification code attached to read originals corresponding to the target for image formation accepted by the selecting portion.

2. The image forming apparatus as defined in claim 1, wherein the identification information includes a page number and heading information.

3. The image forming apparatus as defined in claim 2, wherein the page number of the read originals of a target for image formation is aligned based on the page number extracted by the identification information extracting portion and the output portion performs pairing.

4. The image forming apparatus as defined in claim 1, wherein the identification information is formed with code information.

5. The image forming apparatus as defined in claim 1, wherein with respect to the extracted identification information which is displayed, the selecting portion accepts the identification information selected by the user as the target for image formation.

6. The image forming apparatus as defined in claim 1, wherein the output portion prints image data excluding the identification information.

7. A method for forming an image used in an image forming apparatus having a copy function, comprising:

extracting, by an identification information extraction portion, identification information from image data of read originals based on identification codes attached to the read originals wherein the identification information is extracted while reading the read originals or the identification information is extracted after reading all of the read originals;

displaying, by a display portion a thumbnail image of each read original of the read originals which the identification information was extracted and the extracted identification information pairing with each other;

accepting, by a selection portion, a target for image formation selected by a user based on the display; and printing, by a printing portion, image data with the exception of the identification code attached to read originals corresponding to the target for image formation accepted at the selection step.

8. A non-transitory computer readable medium containing program instructions executed by a processor, non-transitory computer readable medium comprising:

program instructions that extract identification information from image data of read originals based on identification codes attached to the read originals wherein the identification information is extracted while reading the read originals or the identification information is extracted after reading all of the read originals;

program instructions that display a thumbnail image of each read original of the read originals which the identification information was extracted and extracted identification information pairing with each other;

program instruction that accept a target for image formation selected by a user based on the display; and program instructions that print image data with the exception of the identification code attached to read originals corresponding to the target for image formation accepted.

* * * * *